United States Patent
Baracca et al.

(10) Patent No.: US 11,578,758 B2
(45) Date of Patent: Feb. 14, 2023

(54) BEARING UNIT WITH OPTIMIZED SEALING SYSTEM

(71) Applicant: Aktiebolaget SKF, Gothenburg (SE)

(72) Inventors: Fausto Baracca, Massa (IT); Andrea A. Bertolini, Carrara (IT); Fabio Cavacece, Rome (IT); Fabio Falaschi, Carrara (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/236,135

(22) Filed: Apr. 21, 2021

(65) Prior Publication Data

US 2021/0332853 A1  Oct. 28, 2021

(30) Foreign Application Priority Data

Apr. 28, 2020  (IT) .................... 102020000009136

(51) Int. Cl.
*F16C 33/78*  (2006.01)
*F16C 33/80*  (2006.01)

(52) U.S. Cl.
CPC .......... *F16C 33/785* (2013.01); *F16C 33/783* (2013.01); *F16C 33/7843* (2013.01); *F16C 33/80* (2013.01)

(58) Field of Classification Search
CPC ........ F16C 33/784–7856; F16C 33/783; F16C 33/80
See application file for complete search history.

(56) References Cited

U.S. PATENT DOCUMENTS

| 2,375,166 | A |  | 5/1945 | Cooper |  |
|---|---|---|---|---|---|
| 3,206,262 | A |  | 9/1965 | Haag |  |
| 3,768,880 | A |  | 10/1973 | Howe |  |
| 4,309,063 | A |  | 1/1982 | Weis |  |
| 2003/0154602 | A1 | * | 8/2003 | Obara | ............... F16C 19/163 |
|  |  |  |  |  | 29/898.068 |
| 2006/0088238 | A1 | * | 4/2006 | Englander | ............. F04D 29/059 |
|  |  |  |  |  | 384/625 |
| 2021/0010540 | A1 |  | 1/2021 | Baracca et al. |  |

FOREIGN PATENT DOCUMENTS

| DE | 102009013071 |   | 9/2010 |
|---|---|---|---|
| JP | 2017219129 A | * | 12/2017 |

OTHER PUBLICATIONS

Machine Translation of JP-2017219129-A (Year: 2017).*
Search Report for corresponding Italy Patent Application No. 102020000009136 dated Nov. 30, 2020.

* cited by examiner

*Primary Examiner* — Alan B Waits
(74) *Attorney, Agent, or Firm* — Reed Smith LLP

(57) ABSTRACT

A bearing unit having a radially outer ring provided with at least one raceway, a radially inner ring provided with at least one raceway, at least one row of rolling elements interposed between the radially outer ring and the radially inner ring, at least one containment cage for keeping the rolling elements of the rolling element row in position, and a seal interposed between the radially inner ring and the radially outer ring. An anchoring element mechanically locks the seal in a first seat of the radially inner ring, and the anchoring element is housed in a second seat of the radially outer ring.

8 Claims, 2 Drawing Sheets

Det. Y

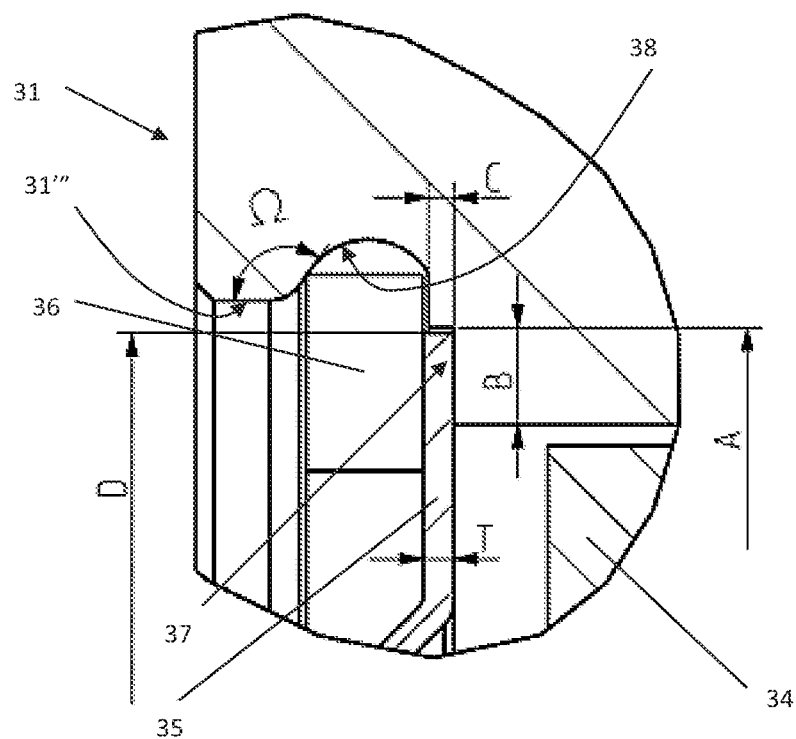
Fig. 2 – Det. Y

BEARING UNIT WITH OPTIMIZED SEALING SYSTEM

CROSS-REFERENCE RELATED APPLICATION

This application is based on and claims priority to Italian Patent Application No. 102020000009136 filed on Apr. 28, 2020, under 35 U.S.C. § 119, the disclosure of which is incorporated by reference herein

FIELD

The present disclosure relates to a bearing unit provided with an optimized sealing system.

BACKGROUND

There are known bearing units provided with rolling elements which, as is also known, are used to allow the relative movement of a component or assembly with respect to another component or assembly. As a rule, a bearing unit has a first component, for example a radially inner ring, which is fixed to a first component, for example a rotating shaft, and a second component, for example a radially outer ring, which is fixed to a second component, for example a stationary housing. Typically, as in the aforementioned examples, the radially inner ring is rotatable, while the radially outer ring is stationary, but in many applications the outer element rotates and the inner element is stationary. In any case, in rolling bearing units, the rotation of one ring with respect to the other is allowed by a plurality of rolling elements that are positioned between the cylindrical surface of one component and the cylindrical surface of the second component, these surfaces usually being called raceways. The rolling elements may be balls, cylindrical or tapered rollers, needle rollers, or similar rolling elements.

BRIEF DESCRIPTION OF THE DRAWINGS

Embodiments of the disclosure will now be described with reference to the attached drawings, which show some non-limiting examples of embodiments of the housing element, in which:

FIG. 2 shows a detail of FIG. 1, with the design of the sealing system of FIG. 1.

DETAILED DESCRIPTION

Figure 1:
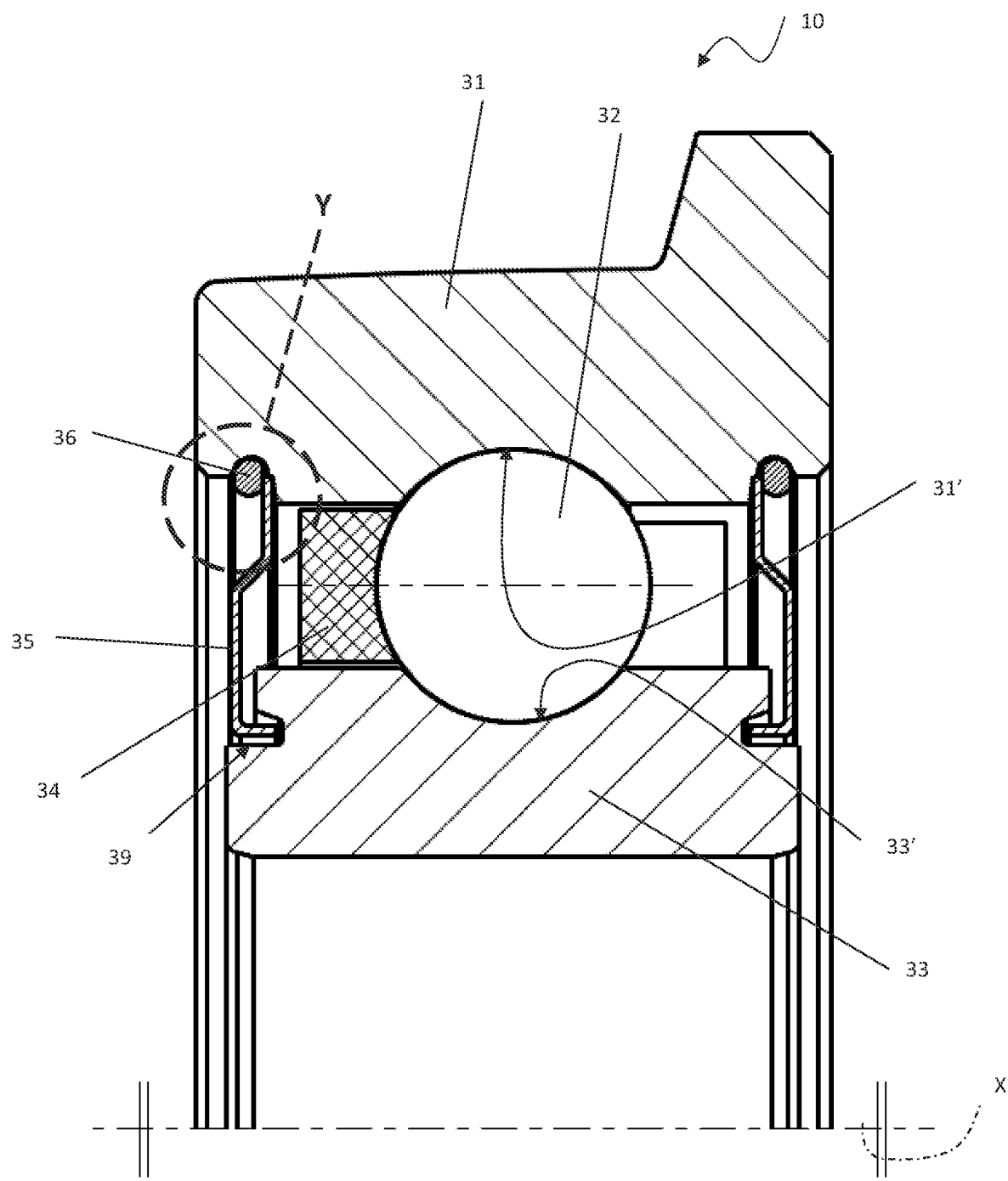
FIG. 1 shows, in cross section, a bearing unit provided with an optimized sealing system according to an embodiment of the disclosure.

This disclosure is directed to a bearing unit that is suitable for applications in the manufacturing sector and especially in the food sector, since it is particularly effective in protecting against external contaminants, owing to its particularly effective sealing system, which is further optimized according to embodiments of the disclosure.

A bearing unit in accordance with this disclosure has suitable sealing systems for protection against external contaminants. The seals are interference fitted in suitable seats in the rings of the bearing unit, in the radially outer ring for example, and are made of metal or plastic material, for example polytetrafluoroethylene (PTFE). Such seals must have high performance, in functional terms and as regards their reliability, throughout the life of the bearing unit. Regarding the latter consideration, for example, the sealing means must not deteriorate over time, and must remain in their seats at all times, to avoid a total loss of functionality.

Indeed, one of the major problems of known solutions is the undesired detachment of the sealing means, in other words its disengagement from its seat during the operation of the bearing unit. It should be noted that a bearing unit operates at a high temperature, especially in food applications, with temperatures of the order of 300-350° C. This very large temperature range creates a different temperature gradient inside the components of the bearing unit. This temperature gradient, in turn, gives rise to different thermal expansions of the components. Since the sealing means according to the prior art are kept in position by mechanical interference means, the effect of the different thermal expansions is to cause the detachment of the seal, since not all the components expand in the same way.

Furthermore, the various components of the bearing unit for high-temperature applications have a considerable axial clearance. This allows contact to occur between the containing cage of the rolling elements, usually made of graphite, and the sealing means, sometimes causing the sealing means to become disengaged from its seat due to the thrust of said cage.

Unfortunately, the selection of the material used for the sealing means does not yield any appreciable benefit. If it is made of PTFE or other plastic material, the sealing means is not significantly affected by the temperature gradient, but its properties, and therefore its functional qualities, are degraded by an increase in temperature. On the other hand, if it is made of metallic material, the sealing means is more subject to the effect of the temperature gradient and, due to the effect of the coefficient of thermal expansion of the metal, which is greater than that of PTFE, the risk of undesired detachment is increased.

Consequently a bearing units in accordance with this disclosure are provided with a sealing system that is free of the aforementioned drawbacks.

The object of embodiments of the disclosure is to provide a bearing unit provided with an optimized sealing system that prevents the disengagement of the sealing means and is therefore free of the drawbacks described above.

According to embodiments of the disclosure, the optimized sealing system is provided with an anchoring element for the sealing means. In order to increase the protection of the bearing from contaminants and prevent the detachment of the sealing means, a new system has been developed for anchoring the sealing means, this system being particularly suitable for high-temperature applications such as food applications.

In particular, because of this optimized sealing system, it is no longer necessary to lock the sealing means by interference, with the consequent appearance of the problems mentioned above; instead, it simply has to be locked mechanically by means of the anchoring element. Thus the effects of the different thermal expansions will have no effect on the retention of the sealing means in its seat.

The mechanical anchoring element of the sealing means also prevents the cage from separating the sealing means from the bearing unit.

Preferably, the anchoring element is a snap ring of metallic material, locked in a seat of the radially outer ring of the bearing unit.

Advantageously, the performance of the anchoring element, and consequently of the sealing means, improves as a result of the precise design of the anchoring element, of its seat in the radially outer ring, and of the sealing means and its seat in the radially outer ring.

Thus, according to embodiments of the disclosure, a bearing unit is provided with an optimized sealing system.

An embodiment of a bearing unit according to the present invention is described below, purely by way of example, with reference to the aforesaid figures. While embodiments herein are generally applicable as bearing units without limit to an intended application, they are particularly well suited for applications in the food sector.

With particular reference to FIG. 1, the bearing unit 10 comprises:
a radially outer ring 31, preferably rotatable, on rollers for example, about a central axis of rotation X of the bearing unit 10,
a radially inner ring 33, preferably stationary,
at least one row of rolling elements 32, in this example balls, interposed between the radially outer ring 31 and the radially inner ring 33,
a containment cage 34 for the rolling elements, for keeping the rolling elements of the row of rolling elements 32 in position.

Throughout the present description and the claims, terms and expressions indicating positions and orientations such as "radial" and "axial" are to be interpreted as relative to the central axis of rotation X of the bearing unit 30.

The radially outer ring 31 is provided with a radially outer raceway 31', while the radially inner ring 33 is provided with at least one radially inner raceway 33' to allow the rolling of the row of rolling elements 32 interposed between the radially outer ring 31 and the radially inner ring 33. For simplicity of illustration, the reference 32 will be applied both to the individual balls and to the row of balls. Also for simplicity, the term "ball" may be used by way of example in the present description and in the attached drawings in place of the more generic term "rolling element" (and the same reference numerals will also be used). Some examples of embodiment and the corresponding designs may provide for the use of rolling elements other than balls (rollers, for example), without thereby departing from the scope of the present invention.

The bearing unit 10 is also provided with sealing means 35 for sealing the bearing unit from the external environment. In the following text, the sealing means 35 may also be referred to more simply as seals 35, although this evidently signifies the same component.

More particularly, and according to an aspect of embodiments of the disclosure, a bearing unit 10 is provided with an optimized sealing system which comprises a sealing means 35 interposed between the radially inner ring 33 and the radially outer ring 31. The sealing means 35 is made of metallic material and has a particular configuration such that it can form, with the radially inner ring, a labyrinth seal 39, which is particularly advantageous for preventing as far as possible the ingress of contaminants into the bearing unit 10.

The sealing means 35 is inserted into a first seat 37 of the radially outer ring 31 and is kept in a stable position in this first seat 37 by the locking action provided by an anchoring element 36, which, according to a preferred solution in the present invention, may be a snap ring 36 of metallic material, for example a Seeger ring. The reference 36 is therefore used in the present description to indicate both the generic anchoring element and the more specific metal snap ring.

The anchoring element 36 is interference fitted into a second seat 38 of the radially outer ring 31. It can therefore be concluded that the optimized sealing system according to the invention comprises the sealing means 35, the anchoring element 36 and the respective first and second seats 37, 38 of the radially outer ring 31.

Advantageously, the performance of the whole sealing system of the bearing unit 10 improves if certain geometric parameters of the components of the whole sealing system are optimally established.

In the first place, the radially internal diameter A of the first seat 37 must be greater than the radially external diameter D of the sealing means 35, so that there is always a clearance between the sealing means 35 and the first seat 37. The first seat 37 will therefore have a guiding function for the sealing means 35, and not, as in the known solutions, an interference locking function for the same component.

Additionally, the axial length C of the first seat 37 must be less than the thickness T of the sealing means 35. In this way it can be ensured that the anchoring element, e.g., 36, will always press the sealing means 35 into its first seat 37, thus providing the function of axially locking sealing means 35. Preferably, the difference between a thickness T of the sealing means 35 and an axial length C of the first seat 37 is in the range from about 0.1 mm to about 0.5 mm.

To ensure a stable support and therefore a good seal, the radial width B of the first seat 37 must be greater than 1 mm.

Finally, the second seat 38 forms an angle Ω with respect to a cylindrical surface 31" of the radially outer ring 31 which must be between 90° and 135°, so that the snap ring 36, when interference fitted, can remain locked and can in turn lock the metal sealing means 35.

Because of this optimized sealing system, therefore, it is no longer necessary to lock the sealing means by interference; instead, it simply has to be locked mechanically by means of the anchoring element. Thus the effects of the different thermal expansions will have no effect on the retention of the sealing means in its seat.

The mechanical anchoring element 36 of the sealing means also prevents the cage 34 from separating the sealing means from the bearing unit. This is because the anchoring element 36, that is to say the snap ring, creates mechanical anchoring that prevents any problem of disengagement due to the movement of the cage 34 or to the different thermal expansions of the components, since, even in the case of maximum differential thermal expansion, there will always be a contact between the snap ring 36 and the metal sealing means 35.

The solution according to the present invention is also very easy to assemble without the need for a press to push the sealing means 35 into the first seat 37 of the radially outer ring 31.

This novel solution also enables the labyrinth seal solution, with its associated benefits, to be used with the radially inner ring 33, without the risk of disengagement of the seal.

The solution using the snap ring 36 is also easy to maintain. It is easy to disengage the sealing means 35 and check the internal conditions of the bearing unit 10.

Finally, the use of a sealing means 35 of metallic material makes it possible to reach temperatures as high as 400° C., by avoiding the use of any plastic and/or elastomeric material which would be unsuitable at such temperatures. Furthermore, in the case of rubber, any burning would make it highly toxic for food applications.

In addition to the embodiments of the disclosure as described above, it is to be understood that numerous other variants exist. It is also to be understood that said embodiments are provided solely by way of example and do not limit the object of the embodiments of the disclosure or its applications or its possible configurations. On the contrary, although the description given above enables those skilled in the art to implement the present invention according to at least one example of its configurations, it is to be understood that numerous variations of the components described may be envisaged without thereby departing from the object of the embodiments of the disclosure as defined in the appended claims, interpreted literally and/or according to their legal equivalents.

What is claimed is:

1. A bearing unit comprising:
a radially outer ring, provided with at least one raceway;
a radially internal ring, provided with at least one raceway;
at least one row of rolling elements interposed between the radially outer ring and the radially inner ring;
at least one containment cage for keeping the rolling elements of the rolling element row in position; and
a seal interposed between the radially inner ring and the radially outer ring;
wherein the seal is mechanically locked in a first seat of the radially outer ring by an anchoring element, the anchoring element is housed in a second seat of the radially outer ring;
wherein the first seat comprises an axial length (C) less than a thickness (T) of the seal;
wherein the difference between the thickness (T) of the seal and the axial length (C) of the first seat is in a range between 0.1 mm and 0.5 mm; and
wherein the first seat comprises a radial width (B) greater than 1 mm.

2. The bearing unit of claim 1, wherein the anchoring element is a snap ring comprising metallic material.

3. The bearing unit of claim 2, wherein a radially internal diameter (A) of the first seat is greater than a radially external diameter (D) of the seal.

4. The bearing unit of claim 1, wherein a radially internal diameter (A) of the first seat is greater than a radially external diameter (D) of the seal.

5. The bearing unit of claim 1, wherein the second seat forms an angle (Ω) with respect to a cylindrical surface of the radially outer ring, wherein the angle (Ω) is between 90° and 135°.

6. A bearing unit comprising:
a radially outer ring comprising a first seat and a second seat;
a radially inner ring;
a seal disposed in the first seat of the radially outer ring and interposed between the radially inner ring and the radially outer ring; and
wherein the seal is mechanically locked in a first seat of the radially outer ring by an anchoring element, the anchoring element is housed in a second seat of the radially outer ring;
wherein the first seat comprises an axial length (C) less than a thickness (T) of the seal;
wherein the difference between the thickness (T) of the seal and the axial length (C) of the first seat is in a range between 0.1 mm and 0.5 mm; and
wherein the first seat comprises a radial width (B) greater than 1 mm.

7. A bearing unit comprising:
a radially outer ring comprising a first seat and a second seat;
a radially inner ring;
a seal disposed in the first seat of the radially outer ring and interposed between the radially inner ring and the radially outer ring; and
an anchoring element housed in the second seat thereby mechanically locking the seal in the first seat of the radially outer ring, wherein the difference between a thickness (T) of the seal and an axial length (C) of the first seat is in a range between 0.1 mm and 0.5 mm, and further wherein the second seat forms an angle (Ω) of between 90° and 135° with respect to a cylindrical surface of the radially outer ring;
wherein the first seat comprises an axial length (C) less than a thickness (T) of the seal; and
wherein the first seat comprises a radial width (B) greater than 1 mm.

8. The bearing unit of claim 7, wherein the anchoring element is a snap ring.

* * * * *